United States Patent [19]

Hamilton

[11] Patent Number: 4,979,214
[45] Date of Patent: Dec. 18, 1990

[54] METHOD AND APPARATUS FOR IDENTIFYING SPEECH IN TELEPHONE SIGNALS

[75] Inventor: Chris A. Hamilton, Montclair, N.J.

[73] Assignee: Dialogic Corporation, Parsippany, N.J.

[21] Appl. No.: 351,785

[22] Filed: May 15, 1989

[51] Int. Cl.[5] .............................................. G10L 3/00
[52] U.S. Cl. ..................................................... 381/46
[58] Field of Search .................................. 381/41–46, 381/110, 47; 364/513.5; 367/198; 455/79; 379/80

[56] References Cited

U.S. PATENT DOCUMENTS

| | | | |
|---|---|---|---|
| 4,028,496 | 6/1977 | La Morche et al. | 387/46 |
| 4,277,645 | 7/1981 | May | 381/46 |
| 4,281,218 | 7/1981 | Chuang et al. | 381/46 |
| 4,597,098 | 6/1986 | Noso et al. | 381/46 |
| 4,677,665 | 6/1987 | Walker | 381/46 |
| 4,688,256 | 8/1987 | Yasunaga | 381/46 |
| 4,829,578 | 8/1989 | Roberts | 381/46 |
| 4,932,062 | 6/1990 | Hamilton | 381/43 |

Primary Examiner—Gary V. Harkcom
Assistant Examiner—John A. Merecki
Attorney, Agent, or Firm—Michael B. Einschlag

[57] ABSTRACT

Method and apparatus for identifying telephone signals which are produced by a human voice. The method includes determining a measure of the energy of predetermined frequency bins of the frequency spectrum of the signal for a frame comprised of a predetermined number of consecutive samples of the signal, if the signal is an analog signal; averaging the measure of the energy of the predetermined frequency bins over a predetermined number of frames to provide a frame group average energy measure; determining the sum of the absolute value of the difference between the frame group average energy measure for all pairs of frame groups which are consecutive in time; and comparing the sum with a predetermined amount to identify the signal as having been produced by a human voice if the sum exceeds the predetermined amount.

12 Claims, 3 Drawing Sheets

METHOD AND APPARATUS FOR IDENTIFYING SPEECH IN TELEPHONE SIGNALS

TECHNICAL FIELD OF THE INVENTION

The present invention pertains to the field of frequency analysis of signals and, in particular, to method and apparatus for identifying the presence of human speech in signals which occur in a telephone network such as the public telephone network.

BACKGROUND OF THE INVENTION

It is well known to those of ordinary skill in the art that automated systems for use in telecommunications applications typically require the capability of analyzing and identifying signals which are transmitted over a telephone network, such as, for example, the public telephone network in order to function properly. For example, it is well known that, under certain conditions, specific machine-generated single-frequency signals, denoted as "call-progress" signals, are transmitted over a telephone network to indicate call status conditions. Examples of commonly occurring call status conditions are busy, call-pickup, operator-intercept and so forth and examples of commonly occurring "call-progress" signals which are used to indicate these call status conditions include, without limitation, SIT tones (system intercept tones), answering machine tones, and so forth.

In addition to machine-generated single-frequency signals, it is also well known that automated systems for use in telecommunications voice processing applications require the capability of analyzing and identifying machine-generated communication signals such as ringback dial tone, dual tone multifrequency (DTMF) tones, and so forth as well as signals which are produced by human speech, noise and hum, and so forth. Such a capability of analyzing and identifying signals has many uses which are well known to those of ordinary skill in the art. For example, if an automated system places a call over the public telephone network to a predetermined telephone number, the automated system needs to have the capability of analyzing and identifying a whole host of signals which correspond, for example, to ringback, operator interception, human voice response to the telephone call, and so forth. In addition, because certain voice processing applications require a human to respond to queries with specific spoken responses, an automated system in such an application needs to have the capability of analyzing the signal produced by the human speech and of identifying the particular spoken response the called party gave.

In addition to the above-described need for an automated system to have the capability of analyzing and identifying signals, it is well known to those of ordinary skill in the art that it is desirable for the automated system to have the capability of analyzing and identifying signals rapidly so that the automated system can take an action which is an appropriate response to the identified signal.

In addition to the above-described need for an automated system to have the capability of analyzing and identifying signals rapidly enough for the automated system to provide an appropriate response to the identified signal, it is well known to those of ordinary skill in the art that the automated system advantageously should have the capability of analyzing and identifying signals which occur in analog signals as well as digital signals.

As one can readily appreciate from the above, there is a need in the art for method and apparatus for analyzing and identifying a signal which is produced by a human voice during telephone interactions with automated systems in telecommunications voice processing applications in order to distinguish that signal from: (a) specific single-frequency signals, i e., "call-progress" tones; (b) machine-generated communication signals such as ringback, dial tone, dual tone multifrequency (DTMF) tones, and so forth; and (c) noise, hum, and so forth. Further, there is a need in the art for method and apparatus for performing such identification rapidly enough that the automated system can take an action which is an appropriate response to the identified signal. Further, in addition to the above-identified needs, there is a need in the art for method and apparatus for performing such identification on on analog signals as well as on digital signals, whether the digital signals are digitally encoded by a differential encoding scheme or a non-differential encoding scheme such as a linear encoding scheme, a u-law encoding scheme, an A-law encoding scheme, a pulse code modulation (PCM) encoding scheme or so forth.

SUMMARy OF THE INVENTION

Embodiments of the present invention advantageously solve the above-identified problems in the art by providing method and apparatus for identifying signals and, in particular, telephone signals, that are produced by a human voice.

Specifically, a preferred embodiment of the inventive method for identifying analog signals that are produced by a human voice comprises the steps of:

(1) determining when the analog signal has reached a first predetermined level corresponding to the presence of a predetermined sound level and, in response thereto, performing a predetermined initialization;

(2) determining when the analog signal has fallen below a second predetermined level corresponding to the absence of the predetermined sound level and, in response thereto, carrying out the steps of the method which commence at step (6);

(3) sampling the analog signal, providing a digital representation of the sample, and grouping the samples into frames, a frame being comprised of a predetermined number of consecutive samples of the analog signal;

(4) determining a measure of the energy of predetermined frequency bins of the frequency spectrum of the analog signal for each frame;

(5) averaging the measure of the energy of the predetermined frequency bins for each frame over a predetermined number of frames to provide a frame group average energy measure;

(6) determining the time duration of the sound and identifying the signal as not having been produced by human voice if the time duration is shorter than a first predetermined time duration;

(7) determining the sum of the absolute value of the difference between the frame group average energy measure for all pairs of frame groups which are consecutive in time;

(8) comparing the sum with a predetermined amount and identifying the signal as having been produced by a human voice if the sum exceeds the predetermined amount and identifying the signal as not having been produced by a human voice if the sum does not exceed the predetermined amount.

In preferred embodiments of the inventive method, the step of determining a measure of the energy of predetermined frequency bins of the frequency spectrum of the analog signal for each frame is performed in accordance with the method disclosed in U.S. Pat. No. 4,932,062 entitled "Method and Apparatus For Frequency Analysis of Telephone Signals," which patent is commonly assigned with this application, which patent has been filed simultaneously herewith, and which patent is incorporated by reference herein.

In addition, the above-described inventive method may be used to identify digital signals which are produced by human speech by omitting the sampling step. Further, as will be described in detail below, the inventive method may be used in a great many applications without regard to whether the digital signal was digitally encoded using a differential encoding scheme or by a non-differentially encoding scheme such as a linear encoding scheme, a u-law encoding scheme, an A-law encoding scheme, a pulse code modulation (PCM) encoding scheme or so forth.

In accordance with the present invention, the frequency spectrum of the signal is determined by analyzing N consecutive samples, for an analog signal, or N consecutive values, for a digital signal. In accordance with the nomenclature used herein, a set of such N consecutive samples or values is referred to as a frame and, in preferred embodiments of the present invention, the number of samples or values per frame, N, is chosen to be $8 < N < 256$.

Further, in accordance with the present invention, a measure of the energy in the $k^{th}$ frequency bin in the frequency spectrum of the signal, denoted as $e_k$, may be determined in many different ways. For example, in a first embodiment of the inventive method, $e_k = R_k^2 + I_k^2$ and, in a second embodiment of the inventive method, $e_k = |R_k| + |I_k|$, where $R_k^2$ and $I_k^2$ are the real and imaginary components, respectively, of the contents of the $k^{th}$ frequency bin in the frequency spectrum of the signal.

In a second embodiment of the inventive method, a measure of the energy for the $i^{th}$ frame, $E_i$, or a frequencyweighted measure of the energy for the $i^{th}$ frame, $F_i$, is determined. $E_i$ and $F_i$ are determined as follows:

$$E_i = \underset{k=0}{\overset{N-1}{\text{Sum}}} e_k \quad \text{and} \quad F_i = \underset{k=0}{\overset{N-1}{\text{Sum}}} e_k * f_k / E_i$$

where:

N is the number of frequency bins in the frequency spectrum of the signal;

$e_k$ is a measure of the energy in the $k^{th}$ frequency bin in the frequency spectrum of the signal in the $i^{th}$ frame; and $f_k$ is the frequency of the $k^{th}$ frequency bin.

Next, in accordance with the second embodiment of the present invention, a frame group average measure of energy and a frame group average frequency-weighted measure of energy for the $r^{th}$ group of J frames is determined as follows:

$$<E>_r = \underset{i=0}{\overset{J-1}{\text{Sum}}} E_i \quad <F>_r = \underset{i=0}{\overset{J-1}{\text{Sum}}} F_i$$

where:

$<E>_r$ and $<F>_r$ are the frame group average measure of energy and the frame group average frequency-weighted energy measure, respectively, for the $r^{th}$ group of J consecutive frames.

Next, in accordance with the second embodiment of the present invention, the absolute value of the difference in frame group average measure of energy or the absolute value of the difference in frame group average frequency-weighted energy measure is determined as follows:

$$V_E = \underset{r=0}{\overset{NT-1}{\text{Sum}}} |<E>_{r+1} - <E>_r|$$

and $$V_F = \underset{r=0}{\overset{NT-1}{\text{Sum}}} |<F>_{r+1} - <F>_r|$$

where:

r is the index of groups of J frames each and NT is the total number of groups of J frames in a particular sound which is being analyzed.

Then, in accordance with the second embodiment of the inventive method, the following tests are performed to identify a signal that was produced by human speech and to distinguish it from other signals:

1. Discriminate between Human Speech and Pure Tone, 60 Hz/120 Hz Hum and a Burst of Uniform Noise: Because almost all human speech possesses a greater deviation in frequency and/or energy than a pure constant tone and because human speech has a greater deviation in frequency and/or energy than 60 Hz/120 Hz hum or a burst of uniform noise, embodiments of the invention method discriminate between human speech and a pure tone, hum, or a burst of uniform noise, if:

$$V_F < C_1 \text{ or } V_e < C_2$$

where $C_1$ and $C_2$ are predetermined constants.

2. Discriminate Between Human Speech and Nonuniform Noise such as Crackling, Phone Handling and so forth:

Although nonuniform noise, such as, crackling, phone handling, and so forth may have values of $V_E$ and $V_F$ which fall in the range encompassed by normal human speech, in any normal speech pattern, one typically encounters a vowel sound early in the string of syllables. Therefore, because vowels typically possess low average frequencyweighted energy, i.e., most of the energy falls in the energy range of 300 Hz < frequency < 900 Hz, and because nonuniform noise seldom has this quality over the length of an average human vowel, i.e., 40-100 ms, embodiments of the inventive method discriminate between human speech and nonuniform noise, such as, crackling, phone handling, and so forth, if, during the first 1.5 seconds or so of the sound, there occurs at least one 40 ms interval which is characterized by $<F>_r < 900$ Hz, then we have identified a sound which was produced by human speech.

In addition to the above described method for distinguishing between human speech and other sources of sound, further embodiments of the inventive method require that one or more predetermined members of the set $<E>_r$ or $E_i$ be greater than a predetermined level in order to rejected spurious low-level voice-like crosstalk.

Lastly, in general, embodiments of the inventive method and apparatus compare the variation in the measure of energy which occurs in the predetermined frequency bins over time with a library of predetermined envelopes of such variations which are stored, for example, in a memory. The embodiment identifies the signal by comparing the input with the library envelopes.

BRIEF DESCRIPTION OF THE DRAWING

A complete understanding of the present invention may be gained by considering the following detailed description in conjunction with the accompanying drawing, in which.

To facilitate understanding, identical reference numerals have been used to denote identical elements common to the figures.

DETAILED DESCRIPTION

Figure 1:
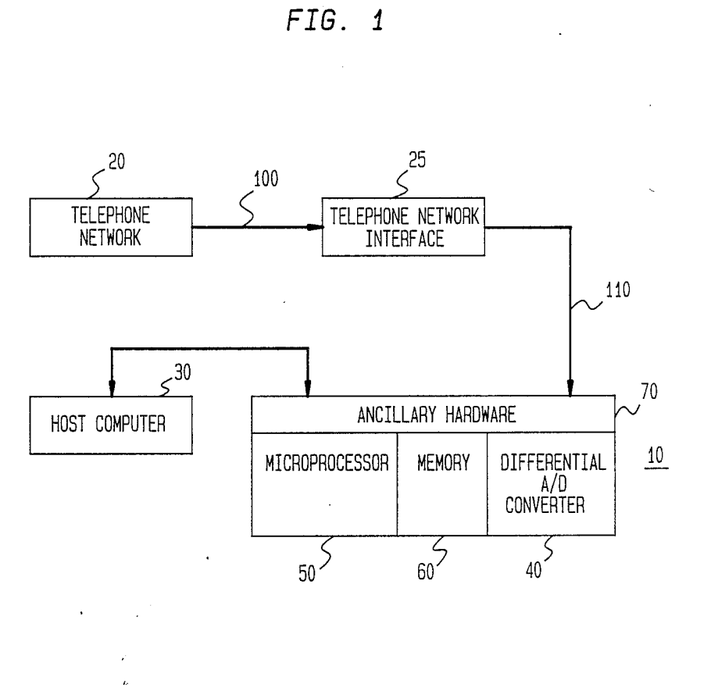
FIG. 1 shows, in pictorial form, a block diagram of a preferred embodiment of the inventive apparatus for identifying the presence of human speech in telephone signals.

FIG. 1 shows a block diagram of a preferred embodiment of inventive apparatus DM 10 and the manner in which it is used for identifying the presence of human speech in telephone signals. As shown in FIG. 1 telephone signal 100 from telephone network 20 is transmitted by telephone network interface 25 to DM 10 as signal 110. Many apparatus for use as telephone interface 25 are well known to those of ordinary skill in the art. For example, one such apparatus comprises a portion of a DIALOG/41 Digitized Voice and Telephony Computer Interface circuit which is available from Dialogic Corporation, 129 Littleton Road, Parsippany, N.J. 07054. In pertinent part, this circuit comprises well known means for interfacing with the telephone network to send and receive calls; means, such as transformers, to electrically isolate subsequent circuits; and filter circuits.

Signal 110 which is output from telephone network interface 25 is applied as input to DM 10 and, in particular, to ancillary hardware 70. Specifically, signal 110 is applied to a sample and hold circuit (not shown) in ancillary hardware 70, which sample and hold circuits are well known to those of ordinary skill in the art.

The output from the sample and hold circuit contained in ancillary hardware 70 is applied to differential analog-to-digital converter 40. There are many circuits which are well known to those of ordinary skill in the art that can be used as differential analog-to-digital converter 40. For example, differential analog-to-digital converter 40 may be a Motorola MC3518 CVSD encoder which is available from Motorola Semiconductor Products Division of Austin, Tex., an Oki Electric MSM5218 ADPCM encoder which is available from Oki Semiconductor of Sunnyvale, Calif., or any other such equipment. The differentially encoded signal output from differential analog-to-digital converter 40 is placed, sample by sample, into a tri-state buffer (not shown) for subsequent transmittal to a data bus (not shown). A tri-state buffer for performing this function is well known to those of ordinary skill in the art. For example, the tri-state buffer may be a TI 74LS244 tri-state buffer which is available from Texas Instruments of Dallas, Tex., or any other such equipment.

DM 10 further comprises microprocessor 50, memory 60, and a portion of ancillary hardware 70 for use interfacing with a host computer 30. Microprocessor 50 may be any one of a number of microprocessors which are well known to those of ordinary skill in the art such as an INTEL 8086 or an INTEL 80188 microprocessor which are available from INTEL of Santa Clara, Calif., or any other such equipment. Memory 60 may be any one of a number of memory equipments which are well known to those of ordinary skill in the art such as an HITACHI 6264 RAM memory which is available from HITACHI America Ltd. of San Jose, Calif., or any other such equipment. The portion of ancillary hardware 70 which interfaces with host computer 30 may be readily fabricated by those of ordinary skill in the art by using circuits which are also well known to those of ordinary skill in the art. For example, the portion of ancillary hardware 70 which interfaces with host computer 30 may be comprised of TI 74LS245 data bus transceivers, TI 74LS244 address buffers, and TI PAL 16L8 control logic, all of which is available from Texas Instruments of Dallas, Tex., or any other such equipment. Finally, as shown in FIG. 1, DM 10 interfaces with host computer 30, which may be any one of a number of computers which are well known to those of ordinary skill in the art such as, for example, an IBM PC/XT/AT, or any other such equipment.

The differentially encoded digital samples output from differential analog-to-digital encoder 40 are placed in the buffer (not shown) and are output, in turn, therefrom to the data bus (not shown). Then, the digital samples are received from the data bus, digital sample by digital sample, by microprocessor 50.

As stated above, apparatus DM 10 identifies the presence of human speech in a telephone signal. In so doing, DM 10 determines the content of certain predetermined frequency bins of the frequency spectrum of incoming telephone signal 100. Advantageously, the inventive method for identifying the presence of human speech does not depend on a determination of exact values of the frequency content of the predetermined frequency bins in the frequency spectrum of incoming signal 100. As a result, embodiments of the inventive method can utilize ADPCM digitally encoded sample values of signal 100 without the need to convert the ADPCM samples into linear PCM sample values. This is advantageous because this broadens the applicability of the inventive method and apparatus and saves the time required to perform such conversions. Further, an additional advantage is that the inventive method and apparatus can be used when incoming signal 100 is already a digital signal b©cause, in such applications, there is no need to convert the input digital signal, which input digital signal may have been encoded using u-law or A-law PCM, into a linear PCM format. Because of this, in describing the inventive method, we will merely refer to the samples which are used in the inventive method and apparatus as digital samples.

Figure 2:
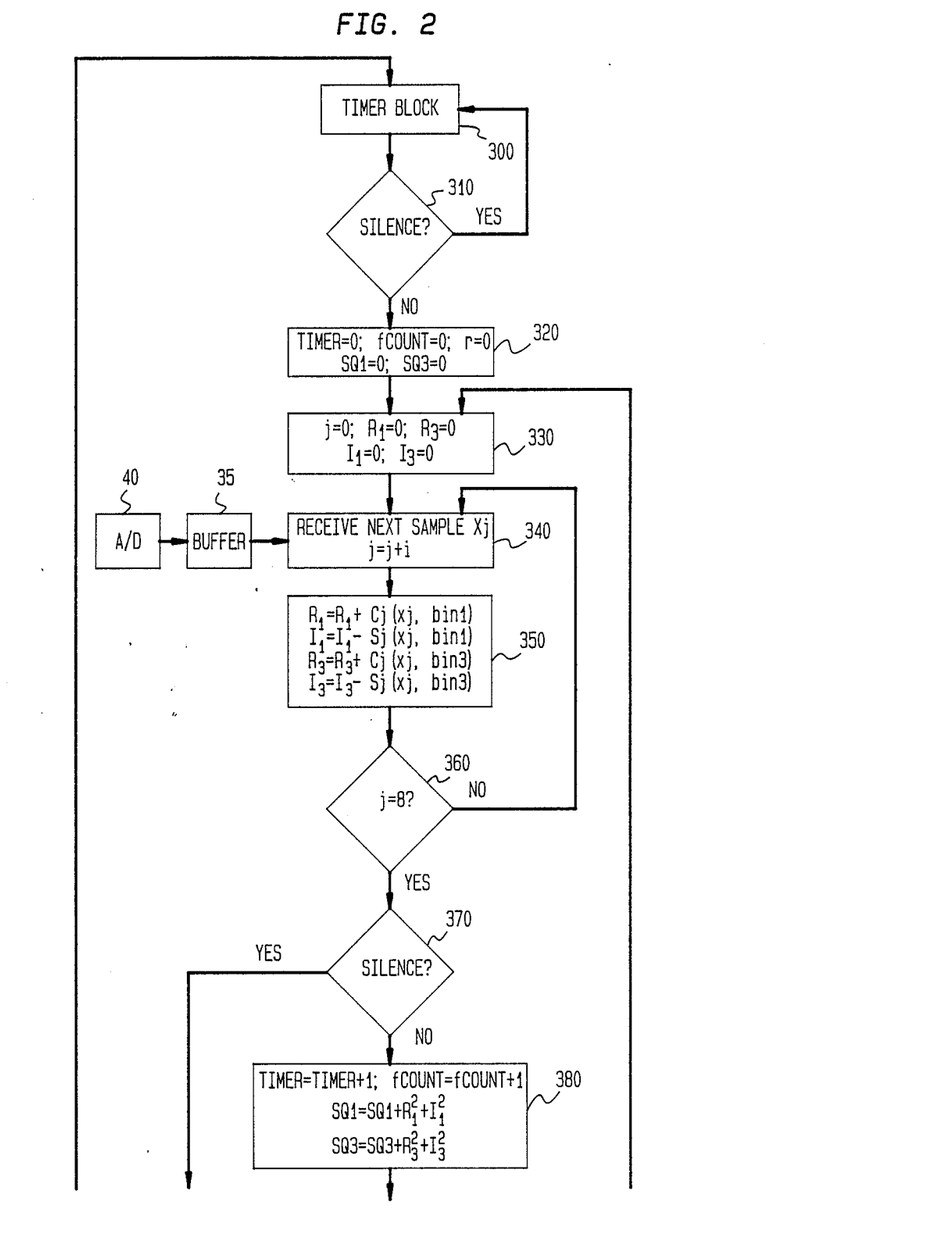
FIG. 2 shows a flow chart of a microprocessor program which forms part of the preferred embodiment of the inventive apparatus shown in FIG. 1.
Figure 3:
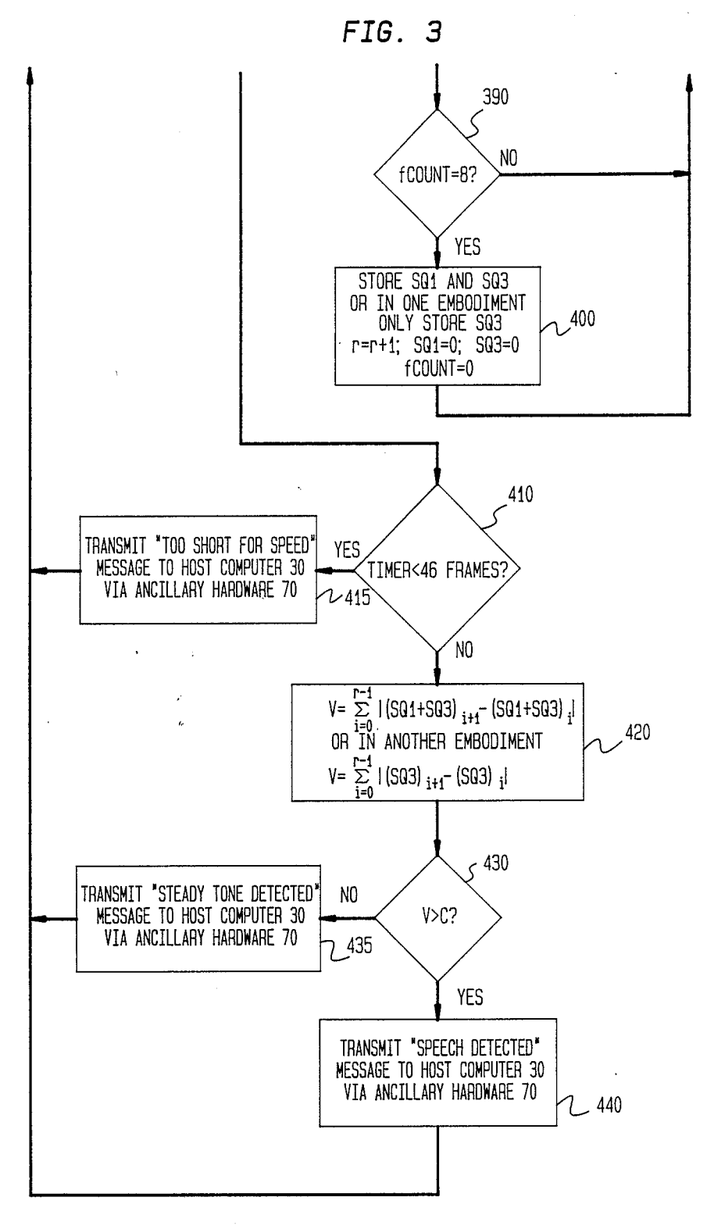

Microprocessor 50 analyzes the digital samples for purposes of identifying the presence of human speech under the direction of a software program which performs in accordance with the flow chart shown in FIG. 2. Microprocessor 50 further communicates with memory 60 and with host computer 30 in the manner which is described in further detail below.

Before discussing how microprocessor 50 identifies human speech in accordance with a preferred embodiment of th present invention, we will first describe how microprocessor 50 operates in general to identify human speech. The inventive method and apparatus identifies human speech on the basis of the variation of a measure of the energy content of various frequency bins of the frequency spectrum of a signal over time. This is done by grouping consecutive groups of samples of a signal into frames and determining a measure of the energy content of various of the frequency bins for each frame. In particular, in a preferred embodiment of the inventive method, we perform a Discrete Fourier Transform (DFT) using 8 samples per frame to determine a measure of the energy content of two predetermined frequency bins in the frequency spectrum of the signal. For example, for a sampling rate of 6000 Hz and using 8 samples per frame, frequency bins 1 and 3 in the frequency spectrum which are used in this analysis correspond to bins containing frequencies equal to 750 Hz and 2250 Hz, rspectively. Then, we determine the fraction of the sum of the measure of energy in these two bins which occurs in the higher frequency bin. Finally, we examine the manner in which this fraction varies from frame to frame during the sound by determining a difference between the fraction in adjacent frames and by adding together the absolute values of these differences during the sound to form an identifying parameter. In accordance with the inventive method, if the identifying parameter is larger than a predetermined amount we have detected human speech. We use this method because we expect the identifying parameter to be smaller when the signal is produced by a pure tone, hum or a burst of uniform noise than it would be when the sound is produced by human speech. In general, embodiments of the inventive method and apparatus compare variations in a measure of the energy content of predetermined frequency bins of the frequency spectrum of the signal with a library of such variations which are stored, for example, in a memory. If a match is found between the input and a library envelope, then we may be relatively certain of the response.

Note that in a further preferred embodiment of the inventive method, we can performed the above-described analysis using the measure of the energy of the higher frequency bin instead of the fraction of the sum of the measure of energy in the higher frequency bin.

In addition to the the above, embodiments of the inventive method and apparatus also use the length of the sound to distinguish been signals produced by human speech and signals caused by other stimuli. For example, human speech ordinarily produces a signal which is longer than 0.35 sec.

FIG. 2 shows a flow chart of a microprocessor program which forms part of the preferred embodiment of the inventive apparatus shown in FIG. 1. Box 300 is a polling mechanism in microprocessor 50 which is energized after a predetermined time interval to cause control of the program in microprocessor 50 to transfer to decision box 310. It should be clear to those of ordinary skill in the art that embodiments of the present invention may operate just as well on an "alarm" basis.

Decision box 310 represents a point in the program at which microprocessor 50 requests and receives an input from a sound detector, not shown, in telephone network interface 25. A sound detector may be fabricated in accordance with methods well known to those of ordinary skill in the art and it transmits a signal to ancillary hardware 70, which signal is transmitted, in turn, to microprocessor 50. As is well known to those of ordinary skill in the art, a sound detector may be implemented in microprocessor 50 by a program which examines the energy in the incoming signal to determine whether the energy is above or below a predetermined level which indicates whether there is sound or silence, respectively. If the program in microprocessor 50 determines that there is silence, i.e., the input signal level is below a predetermined level, then the program in microprocessor 50 transfers control to box 300 to await until another time period has passed before making this examination again. If, however, the program in microprocessor 50 determines that there is no silence, i.e., the input signal is above the predetermined level, then the program in microprocessor 50 transfers control to the portion of the program which corresponds to box 320.

Box 320 represents a point in the program at which microprocessor 50 performs an initialization step to prepare for analyzing the input sound signal by setting the following parameters in memory 60 to 0: timer, fcount, r, SQ1 and SQ3. As will become clear below, timer is a parameter which keeps track of the number of frames during which the sound exists; fcount is a frame counter; r is a counter for counting a predetermined number of frames; and SQI and SQ3 are the measures of energy in frequency bins 1 and 3 of interest, respectively, for all the samples in a frame and for all frames in a group of, for example, 8 frames. For example, for a sampling rate of 6000 Hz and N=8, bins 1 and 3 correspond to bins which include frequencies equal to 750 Hz and 2250 Hz, respectively. Note: even though we are describing a preferred embodiment of the present invention which utilizes two bins, the present invention is not limited to two bins. Further note that all the values of $C_j(x_j,n)$ and $S_j(x_j,n)$ which are needed to determine the contents of the particular frequency bins in accordance with the method and apparatus disclosed in U.S. Pat. No. 4,932,062 entitled "Method and Apparatus for Frequency Analysis of Telephone Signals," which patent has been incorporated by reference herein, have been determined previously and have been stored previously in memory 60. Then the program in microprocessor 50 transfers control to box 330.

Box 330 represents a point in the program at which microprocessor 50 performs a frame initialization by setting the following parameters in memory 60 to 0: j, $R_1$, $I_1$, $R_3$, and $I_3$. As will become clear below, j is a sample index for the samples taken during a frame, $R_1$ and $I_1$ are the real and imaginary components of the frequency spectrum in bin 1 of interest, and $R_3$ and $I_3$ are the real and imaginary components of the frequency spectrum in bin 3 of interest. Then the program in microprocessor 50 transfers control to box 340.

Box 340 represents a point in the program at which microprocessor 50: (1) receives a digitally encoded measurement, also referred to below as a digital sample, from analog-to-digital converter 40, through buffer 35, and (2) increments sample index j in memory 60 by 1.

Then the program in microprocessor 50 transfers control to box 350.

Box 350 represents a point in the program at which microprocessor 50 retrieves the values of $C_j(x_j,\text{bin }1)$, $S_j(x_j,\text{bin }1)$, $C_j(x_j,\text{bin }3)$, and $S_j(x_j,\text{bin }3)$ from memory 60. Box 350 then performs the following sums, stores the results in memory 60, and transfers control to decision box 360:

$$R_1 = R_1 + C_j(x_j,\text{bin }1)$$

$$I_1 = I_1 + S_j(x_j,\text{bin }1)$$

$$R_3 = R_3 + C_j(x_j,\text{bin }3)$$

$$I_3 = I_3 + S_j(x_j,\text{bin }3)$$

Box 350 performs the above-described operation in accordance with the method and apparatus disclosed in the patent application entitled "Method and Apparatus for Frequency Analysis of Telephone Signals," which patent application has been incorporated by reference herein.

Decision box 360 represents a point in the program at which microprocessor 50 examines the sample index j to see if it has reached a predetermined number, here 8, indicative of the fact that we have reached the end of a frame. If the program in microprocessor 50 determines that the sample index j has not reached the predetermined number indicative of the fact that we have reached the end of a frame, then the program in microprocessor 50 transfers control to the portion of the program which corresponds to box 340, otherwise it transfers control to the portion of the program which corresponds to box 370.

Decision box 370 represents a point in the program at which microprocessor 50 requests and receives an input from the sound detector (not shown). If the program in microprocessor 50 determines that there is silence, i.e., the sound energy has fallen below a predetermined level, then the program in microprocessor 50 transfers control to decision box 410 to start an analysis to determine whether the signal was produced by human speech. If, however, the program in microprocessor 50 determines that there is no silence, i.e., the sound has not yet fallen below the predetermined level, then the program in microprocessor 50 transfers control to the portion of the program which corresponds to box 380.

Box 380 represents a point in the program at which microprocessor 50 increments timer and fcount in memory 60 by one. Box 380 then performs the following sums, stores the results in memory 60 and transfers control to decision box 390.

$$SQ1 = SQ1 + R_1^2 + I_1^2$$

$$SQ3 = SQ3 + R_3^2 + I_3^2$$

Decision box 390 represents a point in the program at which microprocessor 50 examines the frame counter fcount to see if it has reached a predetermined number, here 8, indicative of the fact that we have reached the predetermined number of frames. If the program in microprocessor 50 determines that the frame counter fcount has not reached the predetermined number, then the program in microprocessor 50 transfers control to the portion of the program which corresponds to box 330 to prepare to receive another frame, otherwise it transfers control to the portion of the program which corresponds to box 400.

Box 400 represents a point in the program at which microprocessor 50 stores SQ1 and SQ3 in memory 60. Then the program in microprocessor 50: (1) increments frame group counter r; (2) sets SQ1, SQ3, and fcount to zero in memory 60; and (3) transfers control to box 330 to prepare for the next frame group.

Decision box 410 represents a point in the program at which microprocessor 50 examines timer to see if the sound has lasted for a shorter length of time than a first predetermined length of time, for example, 46 msec. If the program in microprocessor 50 determines that timer is smaller than the first predetermined length—indicating that we have detected a short sound, then the program in microprocessor 50 transfers control to box 415. Otherwise the program in microprocessor 50 transfers control to box 420.

Box 415 represents a point in the program at which microprocessor 50 sends a message to host computer 30 informing it that an unrecognized response has been received, then the program transfers control to the portion of the program which corresponds to box 300 to await the start of a new sound.

Box 420 represents a point in the program at which microprocessor 50 determines V, as follows:

$$V = \underset{i=0}{\overset{r-1}{\text{Sum}}} |E_{i+1} - E_i|$$

where:

r is the number of groups of frames detected in the sound thusfar and for each group of frames $E_i = SQ3$ or $E_i = (SQ1 + SQ3)$.

Decision box 430 represents a point in the program at which microprocessor 50 examines V. V represents the magnitude of the change in a measure of the fraction of energy in one of two frequency bins in the frequency spectrum of the signal in consecutive groups of frames. In accordance with the present invention, if the signal was produced in response to a single frequency tone, hum, or uniform noise, it is expected that the energy content of certain predetermined frequency bins will not change by much from one group of frames to the next and, as a result, V will be small. Conversely, if the signal was produced in response to speech, it is expected that the measure of energy of the predetermined frequency bins will change by a larger amount than it would for a single tone, hum or uniform noise and, as a result, V will be larger. In accordance with this, decision box 430 represents a point in the program at which microprocessor 50 examines V to see if it is larger than a predetermined amount C. If the program in microprocessor 50 determines that V is greater than the predetermined amount C, then the program in microprocessor 50 transfers control to box 440 to announce that the sound corresponds to speech, otherwise the program in microprocessor 50 transfers control to box 435 to announce that the sound does not correspond to speech.

Box 435 represents a point in the program at which microprocessor 50 sends a message to host computer 30 informing it that a signal has been received which was not produced by speech, then the program transfers control to the portion of the program which corresponds to box 300 to await the start of a new sound.

Box 440 represents a point in the program at which microprocessor 50 sends a message to host computer 30 informing it that a response has been received that was produced by speech, then the program transfers control to the portion of the program which corresponds to box 300 to await the start of a new sound It should be clear to those of ordinary skill in the art that the specific value of the predetermined amount C used in decision box 430 may be determined by trial and error to maximize the reliability of the decision as to whether or not the signal was produced by speech.

Although we have described a preferred embodiment of the inventive method and apparatus hereinabove, other embodiments of the inventive method may be made without departing from its teachings. For example, in decision box 380, the measure of energy SQ1 and SQ3 could have been determined as follows:

$$SQ1 = SQ1 + |R_1| + |I_1|$$

$$SQ3 = SQ3 + |R_3| + |I_3|$$

In addition to the above, instead of merely developing an energy measure by summing up the energy measure of two frequency bins, one could use all the frequency bins in the frequency spectrum of the signal or a predetermined subset of all of the bins in the frequency spectrum of the signal and compare the variation in these quantities over time with a library of predetermined envelopes of such variations which are stored, for example, in a memory. For example, in a second embodiment of the inventive method, a measure of the energy for the $i^{th}$ frame, $E_i$, or a frequency-weighted measure of the energy for the $i^{th}$ frame, $F_i$, is determined. $E_i$ and $F_i$ are determined as follows:

$$E_i = \underset{k=0}{\overset{N-1}{\text{Sum}}} e_k \quad \text{and} \quad F_i = \underset{k=0}{\overset{N-1}{\text{Sum}}} e_k * f_k / E_i$$

where:

N is the number of frequency bins in the frequency spectrum of the signal;

$e_k$ is a measure of the energy in the $k^{th}$ frequency bin in the frequency spectrum of the signal in the $i^{th}$ frame; and $f_k$ is the frequency of the $k^{th}$ frequency bin.

Next, in accordance with the second embodiment of the present invention, a frame group average measure of energy and a frame group average frequency-weighted measure of energy for the $r^{th}$ group of J frames is determined as follows:

$$<E>_r = \underset{i=0}{\overset{J-1}{\text{Sum}}} E_i \quad <F>_r = \underset{i=0}{\overset{J-1}{\text{Sum}}} F_i$$

where:

$<E>_r$ and $<F>_r$ are the frame group average measure of energy and the frame group average frequency-weighted energy measure, respectively, for the $r^{th}$ group of J consecutive frames.

Next, in accordance with the second embodiment of the present invention, the absolute value of the difference in frame group average measure of energy or the absolute value of the difference in frame group average frequency-weighted energy measure is determined as follows:

$$V_E = \underset{r=0}{\overset{NT-1}{\text{Sum}}} |<E>_{r+1} - <E>_r|$$

and $$V_F = \underset{r=0}{\overset{NT-1}{\text{Sum}}} |<F>_{r+1} - <F>_r|$$

where:

r is the index of groups of J frames each and NT is the total number of groups of J frames in a particular sound which is being analyzed.

Then, in accordance with the second embodiment of the inventive method, the following tests are performed to identify a signal that was produced by human speech and to distinguish it from other signals:

1. Discriminate between Human Speech and Pure Tone, 60 Hz/120 Hz Hum and a Burst of Uniform Noise: Because almost all human speech possesses a greater deviation in frequency and/or energy than a pure constant tone and because human speech has a greater deviation in frequency and/or energy than 60 Hz/120 Hz hum or a burst of uniform noise, embodiments of the invention method discriminate between human speech and a pure tone, hum, or a burst of uniform noise, if:

$$V_F > D_1 \text{ or } V_E > C_2$$

where $C_1$ and $C_2$ are predetermined constants.

2. Discriminate Between Human Speech and Nonuniform Noise such as Crackling, Phone Handling and so forth:

Although nonuniform noise, such as, crackling, phone handling, and so forth may have values of $V_E$ and $V_F$ which fall in the range encompassed by normal human speech, in any normal speech pattern, one typically encounters a vowel sound early in the string of syllables. Therefore, because vowels typically possess low average frequencyweighted energy, i.e., most of the energy falls in the energy range of 300 Hz < frequency < 900 Hz, and because nonuniform noise seldom has this quality over the length of an average human vowel, i.e., 40–100 ms, embodiments of the inventive method discriminate between human speech and nonuniform noise, such as, crackling, phone handling, and so forth, if, during the first 1.5 seconds or so of the sound, there occurs at least one 40 ms interval which is characterized by $<F>_r < 900$ Hz, then we have identified a sound which was produced by human speech.

In addition to the above, further embodiments of the inventive method require that one or more predetermined members of the set $E_i$ be greater than a predetermined level in order to rejected spurious low-level, voice-like crosstalk.

As should be clear to those of ordinary skill in the art, further embodiments of the present invention may be made without departing from its teachings. For example, (1) the inventive method and apparatus may digitally encode an analog signal using a differentially encoded format or a non-differentially encoded format such as a linearly encoded digital signal or a digital signal which has been encoded according to a u-law format or an A-law format and (2) the inventive method and apparatus may be used to directly examine digitally encoded signals and such embodiments would not require a step of converting from analog to digitally encoded form.

What is claimed is:

1. A method for identifying a signal which is produced by a human voice which comprises the steps of:
   (1) determining when the signal exceeds a first predetermined level;
   (2) obtaining the amplitude of the signal and providing a digital representation of the amplitude, if the signal is a digital signal, or obtaining a sample of the amplitude of the signal and providing a digital representation of the sample, if the signal is an analog signal, and grouping the digital representation into frames, a frame being comprised of a predetermined number of consecutive digital representations of the amplitude of the signal, if the signal is a digital signal, or digital representations of samples of the amplitude of the signal, if the signal is an analog signal;
   (3) determining the contents and a measure of the energy of predetermined frequency bins from the contents of the frequency spectrum of the signal for each frame;
   (4) summing the measure of the energy of each of the predetermined frequency bins for each frame over a predetermined multiplicity of frames, a frame group, to provide a set of frame group energy measures for the predetermined frequency bins;
   (5) determining when the signal falls below a second predetermined level;
   (6) determining the time period between the time the signal exceeded the first predetermined level and the time the signal fell below the second predetermined amplitude and identifying the signal as not having been produced by a human voice if the time period is shorter than a first predetermined time period;
   (7) comparing the variation in the set of frame group energy measures for all pairs of frame groups which are consecutive in time during the time period with a predetermined library of variations; and
   (8) identifying the signal as having been produced by a human voice if the step of comparing finds a match with one of the library.

2. The method of claim 1 which further comprises a first step which is performed prior to step (1), which first step comprises the step of:
   storing $C_k(x_k,n)$ and $S_k(x_k,n)$ where:

$C_k(x_k,n) = x_k * \cos(2\pi k n/N)$ and
   $S_k(x_k,n) = x_k * \sin(2\pi k n/N)$ for:
   $k=0,...,(N-1)$; $n=0,...,(N-1)$; and $x_k$ ranging over all the values of a set of M predetermined digital levels which are used to provide the digital representation of the amplitude of the signal, if the signal is a digital signal, or which are used to provide the digital representation of a sample of the amplitude of the signal, if the signal is an analog signal where:
   N is a predetermined number of values of the signal, if the signal is a digital signal, or N is a predetermined number of samples of the signal, if the signal is an analog signal, which are used in determining the frequency spectrum; and
   n is an index frequency bins of the frequency spectrum;

and wherein:
   the part of step (2) of providing a digital representation comprises the step of:
   determining which of the set of M predetermined digital levels correspond to the amplitude values of the signal, if the signal is a digital signal, or to the samples of the amplitude of the signal, if the signal is an analog signal, i.e., determining $x_j$ for $j=0,...,N-1$;
   and wherein step (3) of determining the contents and an energy measure comprises the steps of:
   retrieving values of $C_j(x_j,f)$ and $S_j(x_j,f)$ from storage for each of the predetermined frequency bins and each of the values $x_j$;
   accumulating the sum of $C_j(x_j,f)$ and $S_j(x_j,f)$ for the N digital representation of the amplitude values, if the signal is a digital signal, or for the N digital representations of the samples, if the sample is an analog signal, to determine the real and imaginary part of the contents for each of the predetermined frequency bins f; and
   determining the measure of the energy from the real and imaginary parts of the contents.

3. The method of claim 1 wherein step (3) of determining the contents and the measure of energy for each of the predetermined frequency bins comprises determining a real part and an imaginary part of the contents of the predetermined frequency bins and by summing an absolute value of the real part and an absolute value of the imaginary part of the contents of each of the predetermined frequency bins.

4. The method of claim 1 wherein step (3) of determining the contents and the measure of energy for each of the predetermined frequency bins comprises determining a real part and an imaginary part of the contents of the predetermined frequency bins and by summing a square of the real part of a square of the imaginary part of the contents of each of the predetermined frequency bins.

5. A method for identifying a signal which is produced by a human voice which comprises the steps of:
   (1) determining when the signal exceeds a first predetermined level;
   (2) obtaining the amplitude of the signal and providing a digital representation of the amplitude, if the signal is a digital signal, or obtaining a sample of the amplitude of the signal and providing a digital representation of the sample, if the signal is an analog signal, and grouping the digital representations into frames, a frame being comprised of a predetermined number of consecutive digital representations of the amplitude of the signal, if the signal is a digital signal, or digital representations of samples of the amplitude of the signal, if the signal is an analog signal;
   (3) determining the contents and a measure of the energy of predetermined frequency bins from the contents of the frequency spectrum for each frame;
   (4) summing the measure of the energy of each of the predetermined frequency bins for each frame and over a predetermined multiplicity of frames, a frame group, to provide frame group energy measures;
   (5) determining when the signal falls below a second predetermined level;
   (6) determining the time period between the time the signal exceeded the first predetermined level and the time the signal fell below the second predetermined amplitude and identifying the signal as not having been produced by a human voice if the time period is shorter than a first predetermined time period;

(7) determining a sum of the absolute value of the difference between the frame group energy measures for all pairs of frame groups which are consecutive in time during the time period and comparing the sum with a predetermined amount; and (8) identifying the signal as having been produced by a human voice if the sum exceeds the predetermined amount and identifying the signal as not having been produced by a human voice if the sum does not exceed the predetermined amount.

6. The method of claim 5 wherein the predetermined frequency bins are a single frequency bin.

7. A method for identifying a signal which is produced by a human voice speech which comprises the steps of:

(1) determining when the signal exceeds a first predetermined level;

(2) obtaining the amplitude of the signal and providing a digital representation of the amplitude, if the signal is a digital signal, or obtaining a sample of the amplitude of the signal and providing a digital representation of the sample, if the signal is an analog signal, and grouping the digital representations into frames, a frame being comprised of a predetermined number of consecutive digital representation of the amplitude of the signal, if the signal is a digital signal, or digital representations of samples of the amplitude of the signal, if the signal is an analog signal;

(3) determining the contents and a measure of the energy of predetermined frequency bins from the contents of the frequency spectrum of the signal for each frame;

(4) determining the sum of the measure of the energy of the predetermined frequency bins and a frequency weighted sum of the measure of the energy of the predetermined frequency bins for each frame and over a predetermined multiplicity of frames, a frame group, to provide frame group energy measures and frame group frequency weighted energy measures;

(5) determining when the signal falls below a second predetermined level;

(6) determining the time period between the time the signal exceeded the first predetermined level and the time the signal fell below the second predetermined amplitude and identifying the signal as not having been produced by a human voice if the time period is shorter than a first predetermined time period;

(7) determining a first sum of the absolute value of the difference between the frame group energy measure for all pairs of frame groups which are consecutive in time during the time period and determining a second sum of the absolute value of the difference between the frame group frequency weighted energy measure for all pairs of frame groups which are consecutive in time during the time period; and (8) comparing the first sum with a first predetermined amount and comparing the second sum with a second predetermined amount and identifying the signal as having been produced by a human voice if the first sum exceeds the first predetermined amount and the second sum exceeds the second predetermined amount.

8. The method of claim 7 which further comprises a first step which is performed prior to step (1), which first step comprises the step of:

storing $C_k(x_k,n)$ and $S_k(x_k,n)$ where:

$C_k(x_k,n) = x_k \cdot \cos(2\pi kn/n)$ and
$S_k(x_k,n) = x_k \cdot \sin(2\pi kn/N)$ for:

$k=0,...,(n-1)$; $n=0,...,(N-1)$; and $x_k$ ranging over all the values of a set of M predetermined digital levels which are used to provide the digital representation of the amplitude of the signal, if the signal is a digital signal, or which are used to provide the digital representation of a sample of the amplitude of the signal, if the signal is an analog signal where:

N is a predetermined number of values of the signal, if the signal is a digital signal, or N is a predetermined number of samples of the signal, if the signal is an analog signal, which are used in determining the frequency spectrum; and n is an index of frequency bins of the frequency spectrum;

and wherein:

the part of step (2) of providing a digital representation comprises the step of:

determining which of the set of M predetermined digital levels correspond to the amplitude values of the signal, if the signal is a digital signal, or to the samples of the amplitude of the signal, if the signal is an analog signal, i.e., determining $x_j$ for $J=0,...,N-1$;

and wherein step (3) of determining an energy measure comprises the steps of:

retrieving the values of $C_j(x_j,f)$ and $S_j(x_j,f)$ from storage for each of the predetermined frequency bins and each of the values $x_j$;

accumulating the sum of $C_j(x_j,f)$ and $S_j(x_j,f)$ for the N digital representations of the amplitude values, if the signal is a digital signal, or for the N digital representations of the samples, if the signal is an analog signal, to determine the real and imaginary part of the predetermined frequency bins f; and determining the measure of the energy from the real and imaginary parts of the contents.

9. The method of claim 7 wherein step (3) of determining the contents and the measure of energy for each of the predetermined frequency bins comprises determining a real part and an imaginary part of the contents of the predetermined frequency bins and by summing an absolute value of the real part and an absolute value of the imaginary part of the contents of each of the predetermined frequency bins.

10. The method of claim 7 wherein step (3) of determining the contents and the measure of energy for each of the predetermined frequency bins comprises determining a real part and an imaginary part of the contents of the predetermined frequency bins and by summing a square of the real part and a square of the imaginary part of the contents of each of the predetermined frequency bins.

11. An apparatus for identifying a signal which is produced by a human voice speech which comprises:

means for detecting when the signal exceeds a first predetermined level and, in response thereto, for activating means for obtaining;

the means for obtaining being means for obtaining the amplitude of the signal and for providing a digital representation of the amplitude, if the signal is a digital signal, or for obtaining a sample of the amplitude of the signal and for providing a digital representation of the sample, if the signal is an analog signal, and for grouping the digital representations into frames, a frame being comprised of a predetermined number of consecutive digital representation of the amplitude of the signal, if the signal is a digital signal, or digital representations of samples of the amplitude of the signal, if the signal is an analog signal;

means for determining the contents and a measure of the energy of predetermined frequency bins from the contents of the frequency spectrum of the signal for each frame;

means for summing the measure of the energy of each of the predetermined frequency bins for each frame over a predetermined multiplicity of frames, a frame group, to provide a set of frame group energy measures for the predetermined frequency bins;

means for detecting when the signal falls below a second predetermined level and, in response thereto, activating means for determining a time period;

the means for determining being means for determining the time period between the time the signal exceeded the first predetermined level and the time the signal fell below the second predetermined level and means for identifying the signal as not having been produced by a human voice if the time period is shorter than a first predetermined time period; and means for comparing the variation in the set of frame group energy measures for all pairs of frame groups which are consecutive in time during the time period with a predetermined library of variations and for identifying the signal as having been produced by a human voice if the step of comparing finds a match with one of the library.

12. An apparatus for identifying a signal which is produced by a human voice speech which comprises:

means for detecting when the signal exceeds a first predetermined level and, in response thereto, for activating means for obtaining;

the means for obtaining being means for obtaining the amplitude of the signal and for providing a digital representation of the amplitude, if the signal is a digital signal, or for obtaining a sample of the amplitude of the signal and for providing a digital representation of the sample, if the signal is an analog signal, and for grouping the digital representations into frames, a frame being comprised of a predetermined number of consecutive digital representation of the amplitude of the signal, if the signal is a digital signal, or digital representations of samples of the amplitude of the signal, if the signal is an analog signal;

means for determining the contents and a measure of the energy of the predetermined frequency bins from the contents of the frequency spectrum of the signal for each frame;

means for determining the sum of the measure of the energy of the predetermined frequency bins and a frequency weighted sum of the measure of the energy of the predetermined frequency bins for each frame and over a predetermined multiplicity of frames, a frame group, to provide frame group energy measures and frame group frequency weighted energy measures;

means for detecting when the signal falls below a second predetermined level and, in response thereto, activating means for determining a time period;

the means for determining being means for determining the time period between the time the signal exceeded the first predetermined level and the time the signal fell below the second predetermined level and means for identifying the signal as not having been produced by a human voice if the time period is shorter than a first predetermined time period;

means for determining a first sum of the absolute value of the difference between the frame group energy measure for all pairs of frame groups which are consecutive in time during the time period and determining a second sum of the absolute value of the difference between the frame group frequency weighted energy measure for all pairs of frame groups which are consecutive in time during the time period; and means for comparing the first sum with a first predetermined amount and comparing the second sum with a second predetermined amount and for identifying the signal as having been produced by a human voice if the first sum exceeds the first predetermined amount and the second sum exceeds the second predetermined amount.

* * * * *